US009632909B2

(12) United States Patent
Stall et al.

(10) Patent No.: US 9,632,909 B2
(45) Date of Patent: Apr. 25, 2017

(54) TRANSFORMING USER SCRIPT CODE FOR DEBUGGING

(75) Inventors: Jonathon Michael Stall, Bothell, WA (US); Anthony L. Crider, Mill Creek, WA (US); Igor A Zinkovsky, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1126 days.

(21) Appl. No.: 12/335,739

(22) Filed: Dec. 16, 2008

(65) Prior Publication Data

US 2010/0153927 A1    Jun. 17, 2010

(51) Int. Cl.
G06F 9/44       (2006.01)
G06F 11/36      (2006.01)

(52) U.S. Cl.
CPC ...... *G06F 11/3636* (2013.01); *G06F 11/3624* (2013.01)

(58) Field of Classification Search
CPC .................. G06F 11/3636; G06F 11/3624
See application file for complete search history.

(56) References Cited

U.S. PATENT DOCUMENTS

| | | | | |
|---|---|---|---|---|
| 4,802,165 A | * | 1/1989 | Ream | 714/38.11 |
| 5,450,586 A | * | 9/1995 | Kuzara | G06F 11/3466 714/1 |
| 5,751,942 A | * | 5/1998 | Christensen | G06F 11/3636 714/34 |
| 5,978,917 A | * | 11/1999 | Chi | A63B 23/16 713/188 |
| 6,249,907 B1 | * | 6/2001 | Carter | G06F 11/3624 714/E11.209 |
| 6,263,489 B1 | | 7/2001 | Olsen et al. | |
| 6,324,683 B1 | * | 11/2001 | Fuh | G06F 11/362 714/E11.21 |
| 6,353,923 B1 | | 3/2002 | Bogle et al. | |

(Continued)

FOREIGN PATENT DOCUMENTS

| | | |
|---|---|---|
| JP | H04256035 A | 9/1992 |
| JP | 2003186687 A | 7/2003 |
| JP | 2006268858 A | 10/2006 |

OTHER PUBLICATIONS

Steven P. Reiss "Dynamic Detection of Event Handlers", [Online], Jul. 2008, pp. 1-7, [Retrieved from Internet on Mar. 26, 2016], <http://delivery.acm.org/10.1145/1410000/1401829/p1-reiss.pdf>.*

(Continued)

*Primary Examiner* — Thuy Dao
*Assistant Examiner* — Ziaul A Chowdhury
(74) *Attorney, Agent, or Firm* — Ogilvie Law Firm

(57) ABSTRACT

User script code that is developed to be run in a host application, for example, as a macro can be transformed into debuggable code so that the host application may continue to operate during a debugging stop operation. Traceback methods can be created that call back into the host application to allow the host application to cooperatively operate and update its user-interface. The user script code can be transformed by injecting callbacks to the traceback methods at respective locations in the code where a stopping operation may be installed during debugging. Further, two or more debugging features can be combined into a single user script code transform using an iterator pattern function.

20 Claims, 9 Drawing Sheets

(56) References Cited

U.S. PATENT DOCUMENTS

| | | | |
|---|---|---|---|
| 6,353,924 B1* | 3/2002 | Ayers et al. | 717/128 |
| 6,553,565 B2 | 4/2003 | Click, Jr. | |
| 6,593,940 B1* | 7/2003 | Petersen | G06F 11/3636 714/38.1 |
| 6,701,515 B1 | 3/2004 | Wilson et al. | |
| 6,779,180 B1* | 8/2004 | Palm | G06F 9/4425 712/E9.082 |
| 6,804,814 B1* | 10/2004 | Ayers et al. | 717/135 |
| 6,871,221 B1 | 3/2005 | Styles | |
| 7,007,275 B1* | 2/2006 | Hanson | G06F 9/5055 709/201 |
| 7,367,015 B2* | 4/2008 | Evans et al. | 717/110 |
| 7,383,540 B2 | 6/2008 | Kalra | |
| 8,561,176 B1* | 10/2013 | Dalcher | G06F 11/3604 713/187 |
| 2001/0005852 A1* | 6/2001 | Bogle et al. | 709/102 |
| 2002/0174416 A1* | 11/2002 | Bates | G06F 11/3636 717/128 |
| 2003/0140338 A1* | 7/2003 | Bowers et al. | 717/162 |
| 2004/0205720 A1 | 10/2004 | Hundt | |
| 2004/0210876 A1* | 10/2004 | Stall et al. | 717/127 |
| 2005/0028137 A1* | 2/2005 | Evans et al. | 717/110 |
| 2005/0034024 A1* | 2/2005 | Alverson et al. | 714/38 |
| 2005/0034104 A1 | 2/2005 | Pugh et al. | |
| 2005/0059453 A1* | 3/2005 | Benbrahim | G06F 8/60 463/16 |
| 2005/0097535 A1* | 5/2005 | Plum | G06F 11/3624 717/151 |
| 2005/0246692 A1* | 11/2005 | Poteryakhin | G06F 8/458 717/140 |
| 2006/0248514 A1* | 11/2006 | Messmer | G06F 11/3664 717/127 |
| 2007/0150866 A1* | 6/2007 | Bates | G06F 11/3624 717/124 |
| 2007/0168992 A1* | 7/2007 | Bates | 717/128 |
| 2007/0220490 A1* | 9/2007 | Kobayashi | G06F 9/485 717/124 |
| 2007/0234294 A1 | 10/2007 | Gooding | |
| 2007/0277165 A1* | 11/2007 | Stall et al. | 717/146 |
| 2008/0066055 A1* | 3/2008 | Shebs | 717/124 |
| 2008/0295078 A1* | 11/2008 | Stall et al. | 717/125 |
| 2009/0100413 A1* | 4/2009 | Nash | G06F 11/3636 717/124 |
| 2009/0164978 A1* | 6/2009 | Barker et al. | 717/128 |
| 2009/0282294 A1* | 11/2009 | Edwards | G06F 11/3636 714/45 |
| 2010/0153939 A1* | 6/2010 | Stall et al. | 717/158 |
| 2011/0093747 A1* | 4/2011 | Lawton | G06F 11/3636 714/38.11 |
| 2012/0047486 A1* | 2/2012 | Ashish | G06F 11/3624 7/106 |
| 2012/0254666 A1* | 10/2012 | Liu | G06F 11/3636 714/34 |
| 2012/0317552 A1* | 12/2012 | Bates | G06F 11/3636 717/129 |

OTHER PUBLICATIONS

Guillaume Marceau et al., "The design design and implementation of a dataflow language for scriptable debugging", [Online], Dec. 2006, pp. 59-86, [Retrived from internet on Mar. 27, 2016], <http://download.springer.com/static/pdf/876/art%253A10.1007%252Fs10515-006-0003-z.pdf>.*

K. Theurich et al., "Advanced firmware verification using a code simulator for the IBM System z9", [Online], 2007, pp. 207-216, [Retrieved from Internet on Dec. 18, 2016], <http://ieeexplore.ieee.org/stamp/stamp.jsp?arnumber=5388716>.*

Andrew P. Tolnzach et al., "Debugging Standard ML Without Reverse Engineering", [Online], 1990, pp. 1-12, [Retrieved from Internet], <http://delivery.acm.org/10.1145/100000/91564/p1-tolmach.pdf>.*

Satish Narayanasamy et al., "BugNet: Continuously Recording Program Execution for Deterministic Replay Debugging", [Online], 2005, pp. 1-12, [Retrieved from Internet on Dec. 18, 2016], <http://delivery.acm.org/10.1145/1070000/1069994/22700284.pdf>.*

M. Boule et al., "Debug enhancements in assertion-checker generation", [Online], 2007, pp. 669-667, [Retrieved from Internet on Dec. 18, 2016], <http://ieeexplore.ieee.org/stamp/stamp.jsp?arnumber=4378465>.*

Brender et al., "Debugging Optimized Code: Concepts and Implementation on DIGITAL Alpha Systems", vol. 10 No. 1 1998, http://www.hpl.hp.com/hpjournal/dtj/vol10num1/vol10num1art7.pdf.

"International Search Report", Mailed Date: Jun. 30, 2010, Application No. PCT/US2009/065324, filed Date: Nov. 20, 2009, pp. 10.

Ayers, et al., "TraceBack: First Fault Diagnosis by Reconstruction of Distributed Control Flow", pp. 1-12, Jun. 12-15, 2005 http://www.cs.utexas.edu/~witchel/pubs/pldi05ayer5.pdf.

"Debugging", Date Retrieved: Oct. 21, 2008 http://www.s-lang.org/doc/html/slang-20.html, pp. 1-6.

"pdb—The Python Debugger", p. 1, Date Retrieved: Oct. 21, 2008 http://docs.python.org/library/pdb.html, pp. 1-9.

"Debugging in R", Date Retrieved: Oct. 21, 2008 http://www.robjhyndman.com/research/DebugR.pdf, pp. 1-3.

Second Chinese Office Action cited in Chinese Application No. 200980151578.4 dated Mar. 19, 2013, 8 pgs.

Reply to second Chinese Office Action cited in Chinese Application No. 200980151578.4 dated May 28, 2013, 11 pgs.

Reply to Chinese Office Action cited in Chinese Application No. 200980151578.4 dated Dec. 19, 2012, 10 pgs.

Int. Preliminary Report on Patentability cited in PCT Application No. PCT/US2009/065324 dated Jun. 21, 2011, 4 pgs.

First Chinese Office Action cited in Chinese Application No. 200980151578.4 dated Aug. 28, 2012, 9 pgs.

Japanese Notice of Allowance cited in Japanese Application No. 2011-542189 dated Oct. 15, 2013, 4 Pages.

Chinese Notice of Allowance cited in Chinese Application No. 200980151578.4 dated Jul. 2, 2013, 4 pgs.

"Office Action Issued in Canada Application No. 2,743,568", Mailed Date: Dec. 4, 2015, 4 Pages.

"Extended European Search Report Issued in European Patent Application No. 09835458.2", Mailed Date: Apr. 13, 2016, 07 Pages.

Stall, Mike., "Debugger.Break()", Retrieved from <<https://blogs.msdn.microsoft.com/jmstall/2007/10/03/debugger-break/>>, Oct. 2007, 2 Pages.

"Office Action Issued in Canadian Patent Application No. 2743568", Mailed Date: Sep. 21, 2016, 5 Pages.

* cited by examiner

400 ⟶

402

```
function Foo () {                    404
    var _f = new DebuggerFrame (name="Foo") ;
    $thread.Push (_f)
                    406
    call traceback (1, $thread)
    LINE A    408
    ...
}
```

502 function foo () {    506

508 { LINE A
      LINE B
      LINE C
}

```
Dictionary<string, function> g_functs;
g_functs["foo"] = foo_body;
                                    510
function foo() { // Header
    f = g_functs["foo"];    512
    return f();
}
                        514
function foo_body() {
    LINE A
    LINE B
    LINE C
}
```

```
function foo () {
    string x; // declare local x of type string
    x = "hi"; // statement, does assignment to write local
    print x; // another statement, read local
}
```
— 602

```
function foo () {
    dict $locals = new dict ()                    — 608 call traceback (1, $locals)                   — 610
    $locals ("x") = "hi";

call traceback (2, $locals)                   — 612
    print $locals ("x");
}
```
— 604

```
Struct Frame_foo : {
    string * pX; // address of x                  — 614
} function foo () {
    Frame $f = new Frame (name="foo");            — 616
    $f.pX = &x;
    string x;

call traceback (1, $f)                        — 618
    x = "hi";

call traceback (2, $f)                        — 620
    print x;
}
```
— 606

```
Dictionary<string, function> g_functs;          ╱─ 902
g_functs["foo"] = foo_body;
                                                ╱─ 904
// shared common helper for all function headers
function CommonHelper(string name) {
    IEnumerable e = g_functs[name](); // gets latest version of foo
    $thread.push(new DebuggerStackFrame(name, e));
    Try {
        e.MoveNext(); // move to first traceback spot    ╲─ 906

While(!e.IsAtEnd()) {       ╱─ 908
            Call traceback(e)
            If (SetNextStatementRequested()) {
                Update(e, $targetLine);
                Continue; // loop back to traceback at the target line
            }

Try {
                e.MoveNext(); // executes function body up to the next point
            } catch (Exception ex) {
                Call traceback(exception=ex)
            }
        }
    } finally {
        $thread.Pop()
    }
}
                                    ╱─ 910
function foo() { // Header
    CommonHelper ("foo")
}                                           ╱─ 912
// foo's body is converted into an iterator. The header drives the iterator.
// each yield point becomes a traceback.
function foo_body() {
    yield 1
    LINE A
    yield 2
    LINE B
    yield 3
    LINE C
}
```

FIG. 9

TRANSFORMING USER SCRIPT CODE FOR DEBUGGING

BACKGROUND

Users of computer program applications often find a need to perform specific tasks in the application, sometimes over and over again. For example, a company managing their financial issues may wish perform certain calculations on data populating a spreadsheet in an application. Performing these tasks may be supported by a host application, but applications may also allow a developer/user to create custom solutions to automate desired tasks.

A user of an application or a developer can create macros that perform supported functions in the application, thereby automating a desired task. Macros can be created by recording a series of actions the user performs in the application, or can be developed in source code that is supported by the host application. Developers/users may wish to debug a macro, either before use or after detecting undesirable operations of the macro in the host application. Host applications may run on a platform that comprises an implementation of a programming language framework in an integrated development environment (IDE), which enables a user/developer to write source code, compile the code, and debug the code to be run in the host application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

During debugging of their user script code a developer often inserts breakpoints where they can inspect the test environment to determine whether it is functioning as expected. Further, at breakpoints, a developer may wish to inspect variables, step to different functions without executing the code in between, edit code and continue execution, review exception handling, amongst other things. Currently, during most new debugging operations (e.g., using C# and .NET scripting), when the debugger hits a breakpoint in the application (debuggee) it causes the debuggee to freeze until the debugger is restarted (e.g., when restart is selected by the user). Some older IDE platforms for host applications allow the host application to continue to respond when a breakpoint is hit, which may be desirable. However, if a host application was moved from an older scripting platform to a new scripting platform, a user may not be able to have that host application continue to respond at a debugging breakpoint.

As set forth herein, techniques and systems are provided for enabling debuggability of user script code developed for running in a host application by transforming the user script code into debuggable code. For example, the user script code can be instrumented with script code that can make the user script code debuggable, allowing the debugger to get debugging information from the user code instead of from a debugging API that may impact the host application.

In one embodiment, traceback methods can be created that call back into the host application, which may allow the host application to cooperatively operate and update its user-interface and to continue functioning, even at a debugging stop operation. (e.g., a breakpoint). Further, the user script code can be transformed by injecting a callback to a traceback method at one or more locations in the user script code where a stopping operation may be inserted for debugging. Additionally, debuggability features may be combined in the user script code by transforming the user script code with a common helper function (e.g., an iterator-type function), for example, instead of transforming the code for each debuggability feature desired by the user (e.g., stack frame management, variable inspection, set-next statements, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is an illustration of a transformation of exemplary script code utilizing techniques described herein.

FIG. 5 is an illustration of a transformation of exemplary script code utilizing techniques described herein.

FIG. 6 is an illustration of a transformation of exemplary script code utilizing techniques described herein.

FIG. 9 is an illustration of a transformation of exemplary script code utilizing techniques described herein.

DETAILED DESCRIPTION

Figure 1:
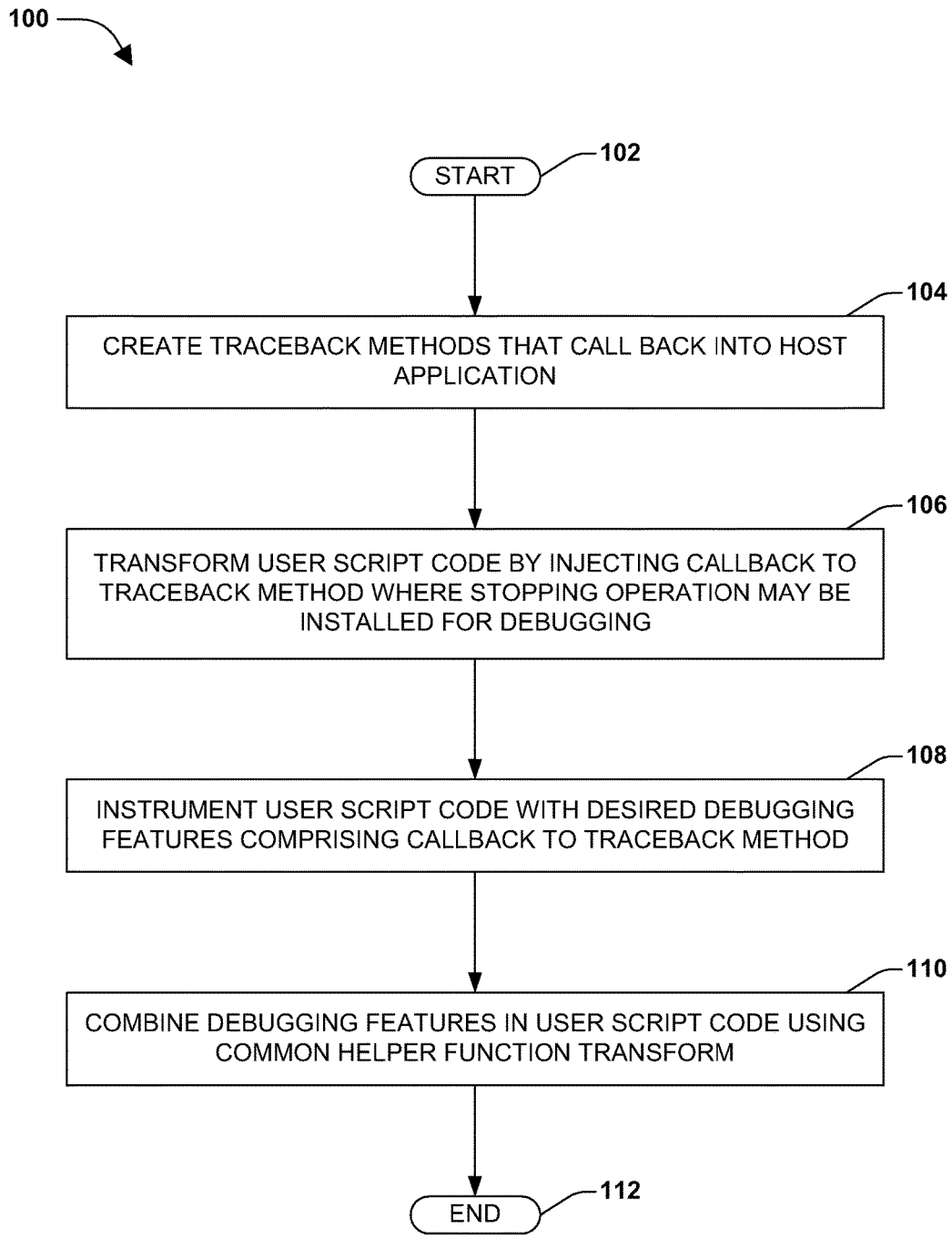
FIG. 1 is a flow diagram of an exemplary method whereby user script code that has been developed for running in a host application can be enabled for debuggability

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 whereby user script code that has been developed for running in a host application can be enabled for debuggability. For example, a user of an application that supports development of custom add-ons may write user script code for a custom macro for the application, and may wish to debug the custom macro. In this example, the exemplary method 100 can be used to transform the user script code into debuggable script code.

The exemplary method 100 begins at 102 and involves creating traceback methods that call back into the host application to allow the host application to cooperatively operate and update its user-interface (UI), at 104. In one embodiment, traceback methods can be created in a library of an application execution and development framework (e.g., ".NET", Java), which can then be called by script code executed in the framework. In this embodiment, when called, the traceback methods can allow a host application to appear to continue functioning at a debugging stopping operation by allowing the host application to operate its UI.

Currently, as an example, when a debugger hits a breakpoint in the debuggee (e.g., the host application running the user script code), the debuggee may freeze until it is inspected by the user and the debugger is restarted. In this example, the debuggee typically freezes because it is being controlled by the debugger, which stops the host application at a breakpoint, inspects the data and merely restarts the debuggee when a user commands it to continue. Traditionally, debugging breakpoints stop a thread in the application, for example, which blocks a message pump (e.g., message pump picks up control commands and executes event associated with command) from responding to commands in the UI.

However, a traceback method can be used to transfer control back to the host application, tier example, at a breakpoint. The host application may continue to pump messages from the UI (e.g., or console inputs for a console host) instead of having the debugger call the operating system to park the thread at an opcode for the breakpoint, as in traditional debugging breakpoints. In this example, the thread can he parked in the traceback method, which transfers control hack to the host application.

At 106, in the exemplary method 100, the script code created by a user for use in the host application can be transformed by injecting a callback, which calls to a traceback method, at one or more locations in the user script code where a stopping operation may be installed for debugging. Callbacks to a traceback method can be injected at respective locations where a potential breakpoint may be used in debugging. In this way, for example, whenever a breakpoint is encountered during debugging of the user script code, the traceback method can be called, which allows for the host application to continue functioning during the breakpoint.

At 108, the user script code is instrumented with desired script code debugging features that comprise a callback to a traceback method. For example, a user that develops script code to run as a macro in a host application may wish to enable desired debugging features for the user script code. In this example, the user's desired debugging features can be instrumented into the user script code during compilation of the code (e.g., by a framework's high-level language compiler or by a dynamic runtime environment of the framework), which can transform the user script code into debuggable code for the desired features.

In one embodiment, a host application's macro development platform may present a user with a menu of features that can be instrumented into the user's code. In this way, for example, the user can select merely those debugging features desired, and the user script code can be transformed by instrumenting the user script code with those selected debugging features.

At 110, in the exemplary method 100, two or more separate script code debugging features can be combined in the user script code by using a common helper function transform. For example, debugging features that a user wishes to include in their user script code may be unified together in a common helper transform of the code, which can support respective debugging features. In one embodiment, for example, where more than one debugging feature may be instrumented into the user script code at the same location, they can be combined in a common helper function transformation of the code that provides support for the respective features.

Having combined debugging features, the exemplary method 100 ends at 112.

In one aspect, transforming the user script code can be high-level language agnostic, in one embodiment, the user script code can be transformed by a language compiler that is part of an application execution and development framework, which compiles a high-level language into an intermediate language (IL) utilized by the framework. In another embodiment, the script code transforms may be done in the framework's dynamic runtime environment (e.g., .NET just-in-time compilation service in the common language runtime), which compiles the framework's IL into machine language to be executed. In these embodiments, the transforms may be language agnostic, as transformations are done during compiling using the framework's compilation services.

In another aspect, calls to traceback methods are injected into the user script code at those locations where a stopping operation (e.g., a breakpoint, stepping operation, asynchronous break, etc.) may be used by a debugger. In one embodiment, in this aspect, a user script code transformation can inject calls to a traceback method at respective potential stopping points where arguments to the traceback method can include a context of the stopping operation.

Figure 2:
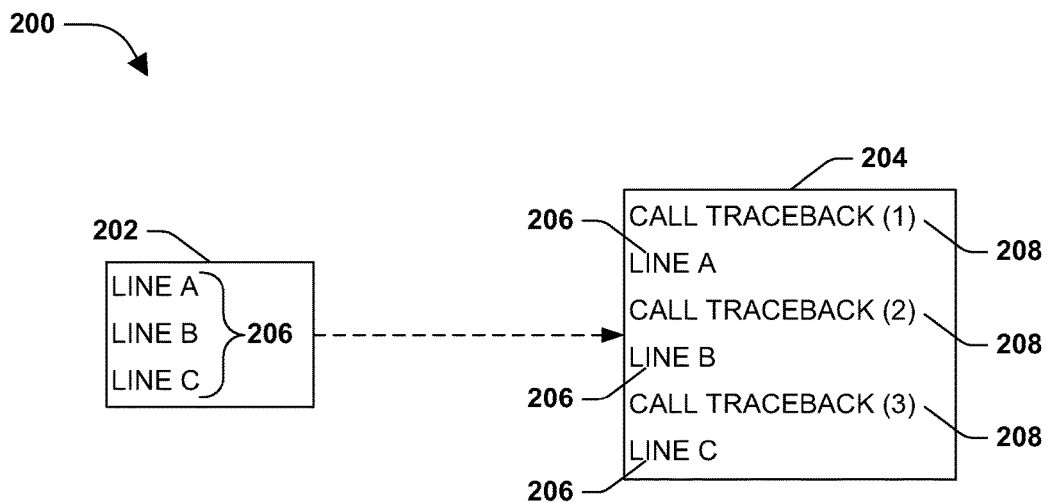
FIG. 2 is an illustration of a transformation of exemplary script code utilizing techniques described herein.

FIG. 2 is an illustration of exemplary script code 200 where calls to traceback methods are injected at potential stopping points in the code. Script code 202 written by a user (e.g., for use as a macro in a host application) is comprised of three lines of code 206, lines A, B, and C. During debugging, a debugger may utilize breakpoints before each of the lines of code 206. In this example, the user script code 202 can be transformed 204 (e.g., by a compiler) by injecting a callback to a traceback method 208 before the respective lines of code 206. Here, calls to tracebacks one, two, and three 208, have been injected that can identify a location of potential breakpoints.

In one embodiment, for example, when the debugger appears to have stopped the debuggee at a breakpoint, a thread may not actually be stopped at a hard-mode breakpoint. Instead, in this example, the thread can be parked inside the called traceback method implemented by a host application, at a cooperative control delegator (e.g., a message pump) that allows the host to continue to function. Further, in this example, the thread may not resume from the traceback method until after the debugger continues from the breakpoint.

Additionally, in this embodiment, tracebacks can be a no-operation (nop), so that they have little impact on the executing code. For example, if a debugger requests a stopping operation (e.g., a breakpoint) the traceback method can detect the requested stop appropriately. However, if there is no requested stopping operation from the debugger, no operation is performed by the traceback method.

In another aspect, various user script code transformations may be performed to enable debugging features. It will be appreciated that, while the following embodiments and examples identify several common debugging features for script code, the techniques and systems, described herein, are not limited to any particular debugging features. Those skilled in the art may devise alternate debugging features that can be instrumented into a user script code, developed for running in a host application, by transforming the user script code into debuggable code.

Figure 3:
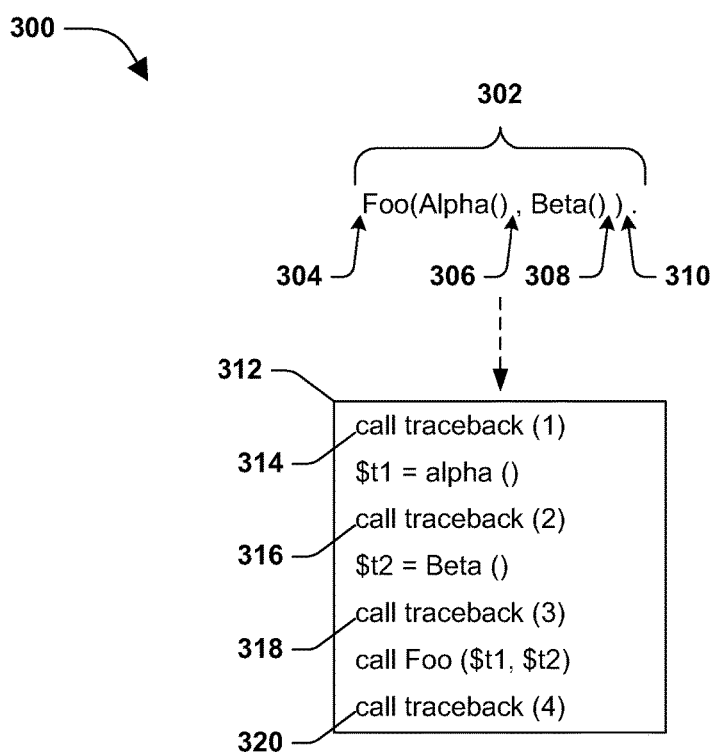
FIG. 3 is an illustration of a transformation of exemplary script code utilizing techniques described herein.

FIG. 3 is an illustration of exemplary script code 300 where user script code can be transformed to perform stepping during debugging of the script code. An example line of user script code 302 can comprise locations that can be stepped to or a breakpoint may be set during debugging: one may stop at a beginning 304 of the user script code 302 for a source-level breakpoint; after stepping out of Alpha, before stepping into Beta 306; after stepping out of Beta; and after stepping out of Foo( ).

The example line of user script code 302 can be transformed into debuggable code 312 that comprises calls to traceback methods at the respective stepping or stopping points in the user script code. Therefore, a call to traceback one 314 can be injected at the beginning of the line 304; a call to traceback two 316 can be injected after Alpha and before Beta 306; a call to traceback three can be injected after Beta 308; and a call to traceback four can be injected after Foo( ) 310.

Traditionally, stepping through script code during debugging is supported by a CPU using flags and executing single instructions. In this embodiment, stack steps of the respective tracebacks are known, depending on a type of stepping performed (e.g., step-in, step-out, step-over), a next traceback is known based on its designation. For example, a step-in can merely be stopping at a next traceback (e.g., from traceback two to three), regardless of the function that comprises the traceback. Further, in this example, a step-over may be stopping a next traceback and a current (or less) stack level. Additionally, in this example, a step-out can be stopping at a next traceback at a shallower stack level.

FIG. 4 is an illustration of transformed exemplary script code 400 that may allow a function to maintain its own callstack, comprising script frames from the user code, for a debugger. In this example, script code for a function Foo( ) 402 has been transformed, whereby a thread's debugger stack, $thread 406, can be maintained by the function Foo( ), allowing it to push or pop a debugger frame 404. The transformation utilizes a call to a traceback method 408 to allow continued functionality of the host application while the debugger pushes or pops frames.

In one embodiment, the thread's debugger stack, $thread 406, can be stored in a thread-local storage. In another embodiment, the thread's debugger stack, $thread 406, can be passed as a hidden parameter to respective user-code functions. In this way, for example, a debugger's callstack window may be an inspection operation on user data in the thread's debugger stack, $thread 406.

FIG. 5 is an illustration of exemplary script code 500 where user script code can be transformed to allow a single function to be split into a separate header and body. In this example, user script code 502 for a function foo( ) comprises the function's header 506 and its body 508. The user script code 502 can be transformed into debuggable script code 504 that splits the function into its header 506 and body 508, for example, during compilation.

In the debuggable script code 504, the function header 506 has been transformed into a function that identifies the header by a reference "foo" 512; and the function body 508 has been transformed into a function foo_body 514. A reference has been created for a global table 510 that links the header function 512 with the body function 514. This may allow the function body 514 to be stored in the global table and be updated, for example. Further, in this example, the header function 512 can be used to fetch a latest version of the corresponding body from the global table.

In one embodiment, various transforms may be applied to a function body. A function body may be swapped out for editing purposes in an "edit-and-continue" debugging feature, for example, In this example, a first function body can be swapped out and a set-next statement may be used to map from the first function body to a second function body. In another example, the function body may be swapped out for deoptimization purposes, while other functions can continue to have a stable reference to the function header.

In another embodiment, common debugging infrastructure may be stored and shared in a function header, split from its body. For example, infrastructure code stored in the function header could comprise notification hooks used by a debugger. In another example, infrastructure code stored in the function header could comprise drivers for a switch table that may be used for set-next statements in debugging.

FIG. 6 is an illustration of exemplary script code 600 where user script code can be transformed to allow for value inspection during debugging. For example, a function may publish its local variable to a frame object, which can be done in different ways. In this example, a function foo( ) 602 comprises a string variable 'x', and statements for writing and reading the local variable.

In one embodiment 604, the locals can be hoisted into a closure or dictionary object 608. In one example, in this embodiment, hoisting the locals into a dictionary object may adjust the locals' storage and may force them to be on a heap. In 604, statements comprise calls to traceback methods for writing 610 and reading 612 the local variables.

In another embodiment 606, addresses of locals may be described via a customized display frame 614. In one example, in this embodiment, the locals could be allowed to live on a stack comprising the customized frame 614, which may have less impact on the locals storage. For the function foo( ) a new frame can be created 616 that comprises unverifiable pointer code. Statements for writing 618 and reading 620 the local respectively comprise calls to traceback methods, allowing for a host application to continue to operate its UI during debugging, for example.

In both embodiments, variable homes are described in a display object 610, 612, 618, 620, which can be available in a traceback for the debugger. As an example, the locals may not need to be "spilled" to a display object until the function reaches a traceback, allowing the host application to continue to operate its UI during debugging. In 604, the locals can be "spilled" to the stack to be preserved across traceback function calls, for example.

Figure 7:
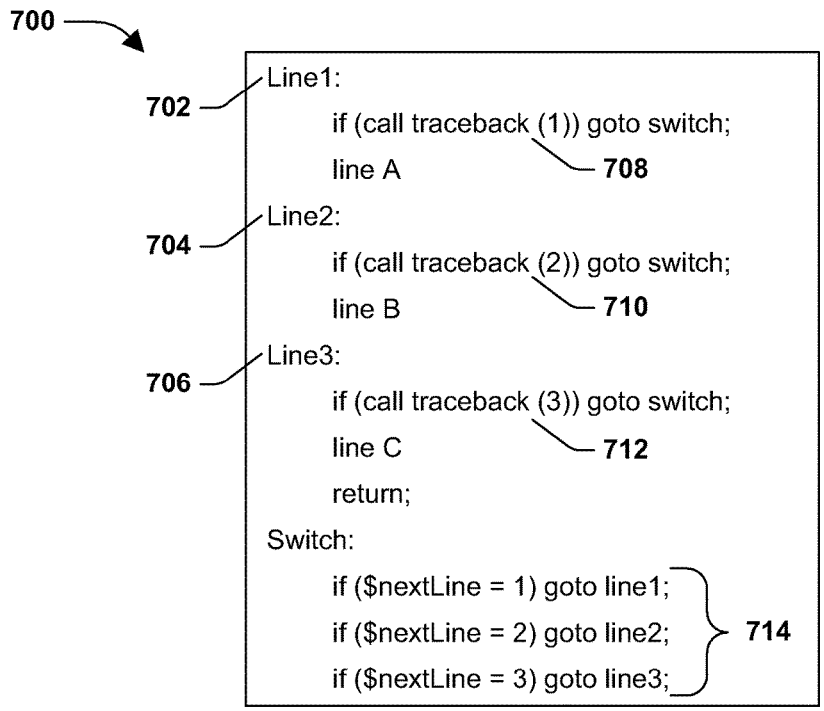
FIG. 7 is an illustration of a transformation of exemplary script code utilizing techniques described herein.

FIG. 7 is an illustration of exemplary script code 700 where user script code can be transformed to allow for use of "set-next" statements during debugging. In one embodiment, using a set-next statement a debugger can set a next active statement in a current frame without executing user code in between. In this embodiment, a source and target statement are in a same function, and either can be before or after the other. For example, if a thread is parked at a traceback for line B 710, a debugger user may be able to move the thread to a traceback for line A 708, without executing user code in between.

This type of set-next statement can be implemented by injecting a switch table 714 into the function, as illustrated in the exemplary script code 700. In this example, if a debugger user does a set-next statement while in a traceback 708, 710, 712, the debugger can set the pseudo local "$nextLine" 714 to a target line and the appropriate traceback can return "true." In this example, this can cause a control for a pointer to jump to the next switch table (at a switch label) 714 and then to an appropriate line 702, 704, 706.

It will be appreciated the above embodiment is merely one example of implementing switch tables to utilize set-next statements for debugging. The techniques and systems, described herein, are not limited to the above embodiment. For example, C# "iterators" or "generators" in Python may also be implemented with a switch table. In this example, a user code transform may be able to leverage converting the user code function to an iterator as a means of getting a switch table. Those skilled in the art may devise alternate means for utilizing switch tables for set-next functions in debugging.

Figure 8:
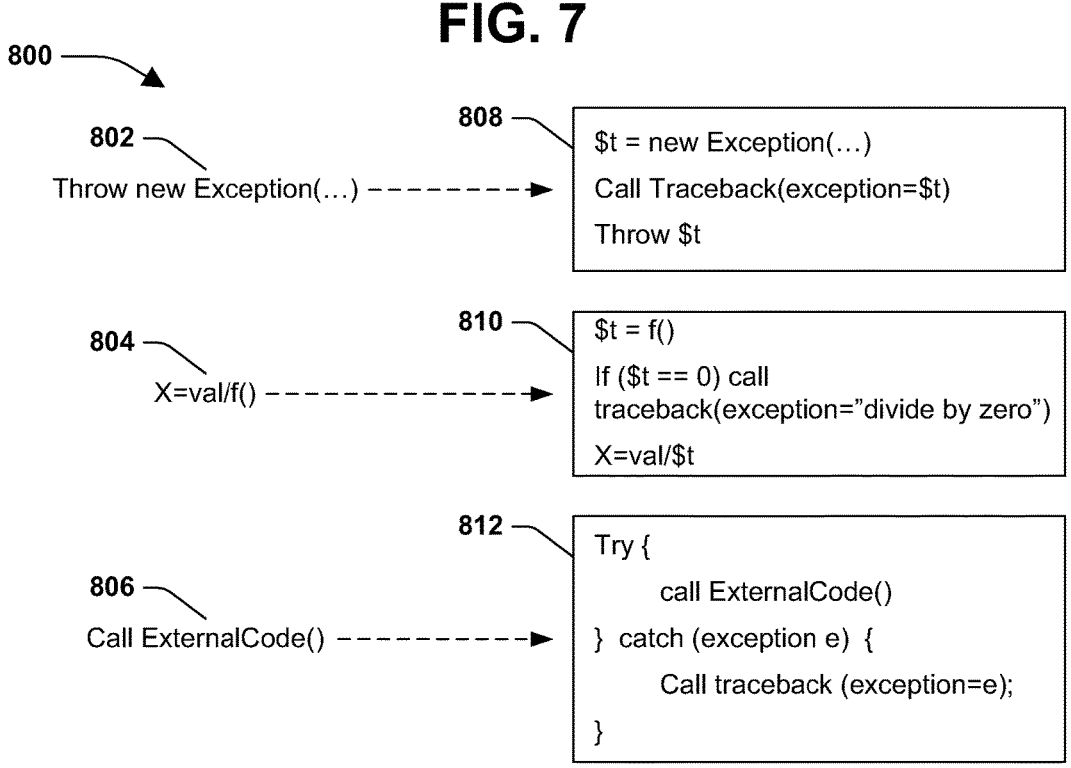
FIG. 8 is an illustration of a transformation of exemplary script code utilizing techniques described herein.

FIG. 8 is an illustration of exemplary script code 800 where user script code can be transformed to allow for exception handling during debugging. In one embodiment, an explicit "throw" keyword can be used for a synchronous exception, as in the exemplary code at 802. In this embodiment, calls to traceback methods can be inserted for the synchronous exceptions, so that the "throw" exception example is transformed into 808, where a traceback is called for the explicit exception $t.

In another embodiment, asynchronous exceptions such as those caused by a divide-by-zero or null reference can be made synchronous using explicit checks. In this example, the exemplary user code 804 calls for a divide-by function, This code can be transformed 810 so that, if the divide-by value is zero a traceback function for this exception is called. Otherwise the value can be divided into the original function value.

In another embodiment, script code may call out to non-script code 806. In this embodiment, for example, exceptions in non-script code may not be visible to a script debugger until they enter the script code. In this embodiment, the script code can be transformed 812 so that outgoing calls are wrapped in a try-catch block 812. Further, the transformed code comprises a call to a traceback method for exception handling, as described above.

It will be appreciated that, while several embodiments of transforms of user script to script code comprising common debugging features have been described above, the techniques and systems described herein are not limited to these debugging features. Debugging features are numerous and varied and those skilled in the art may devise alternate debugging features that can be brought into script code by performing user script transforms as described above.

In another aspect, a transform may combine one or more debugging features, such as function header/body splitting, exception handling guards, switch tables, explicit stack frames creation, local variable hoisting, tracebacks, and others into a single transform of the user script code, based on an iterator pattern, such as a common helper function. FIG. 9 is an illustration of exemplary script code 900 where user script code can be transformed to allow for combination of two or more debugging features using an iterator pattern.

The example feature combination transform comprises inserting script code that maps function bodies to a global table of function bodies 902. In this example, the global table "g_functs" maps the function header "foo" with its corresponding body "foo_body." A common helper function 904 can be inserted in the transform that can be shared across different implementations. The helper function 904 can call to the global table 906 for a latest version of a function body for a function header, where a function body may have been edited, for example. Further, the helper function 904 can comprise two or more debugging feature transforms 908 for the user script code, such as tracebacks, set-next statements, and exception handling.

In this example, the function "foo" calls to the common helper function 904, with a string "foo" 910. The "foo_body" 912 is like an initial body but comprises yields where breakpoints may be initiated for debugging. The body 912 is converted into an iterator, where the header 910 drives the iterator and respective yields can become calls to traceback methods before the statement lines of the function. In this way, in this example, the iterator pattern can be used to combine more than one debugging feature into a user script code transform.

Figure 10:
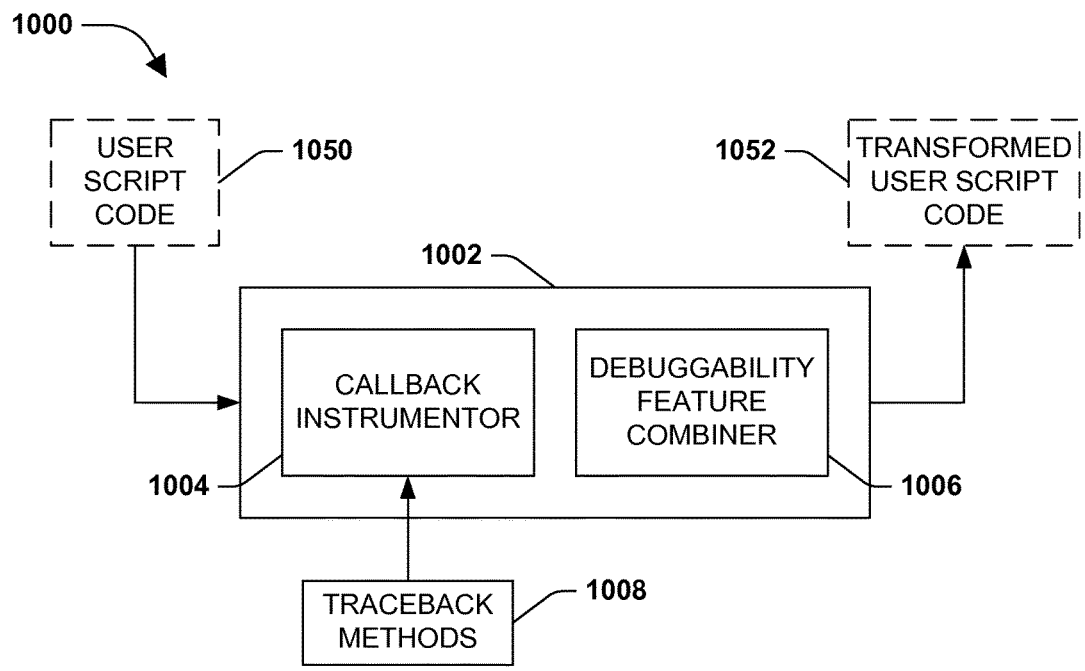
FIG. 10 is a block diagram of an exemplary system for transforming user script code, developed for running in a host application, into debuggable code.

A system may be devised that can enable a user script code, developed for use in a host application, to be debugged, for example, while allowing the host application to operate its user interface (UI). FIG. 10 is a block diagram of an exemplary system 1000 for transforming user script code, developed for running in a host application, into debuggable code. For example, where a user/developer may wish to debug user script code they developed to run as a macro in a host application, the exemplary system 1000 may transform the user script code into debuggable code so that the host application can continue responding to UI events during a stopping operation in debugging.

The exemplary system 1000 comprises traceback methods 1008 that can be configured to call back into the host application to allow the host application to cooperatively operate and update its UI, for example, to appear to continue functioning at a debugging stopping operation. In one embodiment, a traceback method can transfer control back to the host application, which can continue to operate a message pump for performing UI events.

The exemplary system 1000 further comprises a user script code transformation component 1002, which can be configured to transform user script code 1050 developed for running in a host application. The user script code transformation component 1002 comprises a traceback method callback instrumentation component 1004, which can be configured to inject a callback, which calls to a traceback method 1008, at one or more locations in the user script code 1050 where a stopping operation may be installed for debugging. For example, the traceback method callback instrumentation component 1004 may transform user script code 1050 by injecting a call to a traceback prior to respective functions, and/or statements in functions of the user script code 1050.

The user script code transformation component 1002 further comprises a user script code debugging feature combiner 1006 that can be configured to combine two or more script code debugging features in the user script code 1.050 by using an iterator pattern transform. For example, if a user/developer of the script code 1050 wished to utilize several debugging features during debugging of the code, such as tracebacks, set-next statements, variable inspection, edit and continue, and others, an iterator pattern may be used to combine these transforms into one transform. hi this example, a common helper function can be injected into the code that allows a combination of more than one debugging feature using an iterator pattern. In this way, the user script code transformation component 1002 can transform user script code 1050 into transformed user script code 1052 that is debuggable, for example, while the host application can continue to function without utilizing cooperation from an operating system's virtual machine.

In one embodiment, the user script code debugging feature combiner can be configured to insert script code that maps function headers to a global table of function bodies. Further, the user script code debugging feature combiner can be configured to insert script code that has respective function headers, having debugging features to be combined, call an iterator pattern function. Additionally, the user script code debugging feature combiner can be configured to retrieve corresponding updated function bodies that have been transformed to include code enabling a debugging feature using the iterator pattern function. In this way, for example, a function that may comprise more than one debugging feature can have a single transform that combines respective debugging features.

In another embodiment, the user script code transformation component 1002 can further comprise a function separation component, which can be configured to compile a function into a separate header and body, and store the function body in a global table comprising function bodies mapped to corresponding function headers. In this way, for example, a function body may be edited during debugging and the body can still be mapped to its corresponding header using the global table.

Figure 11:
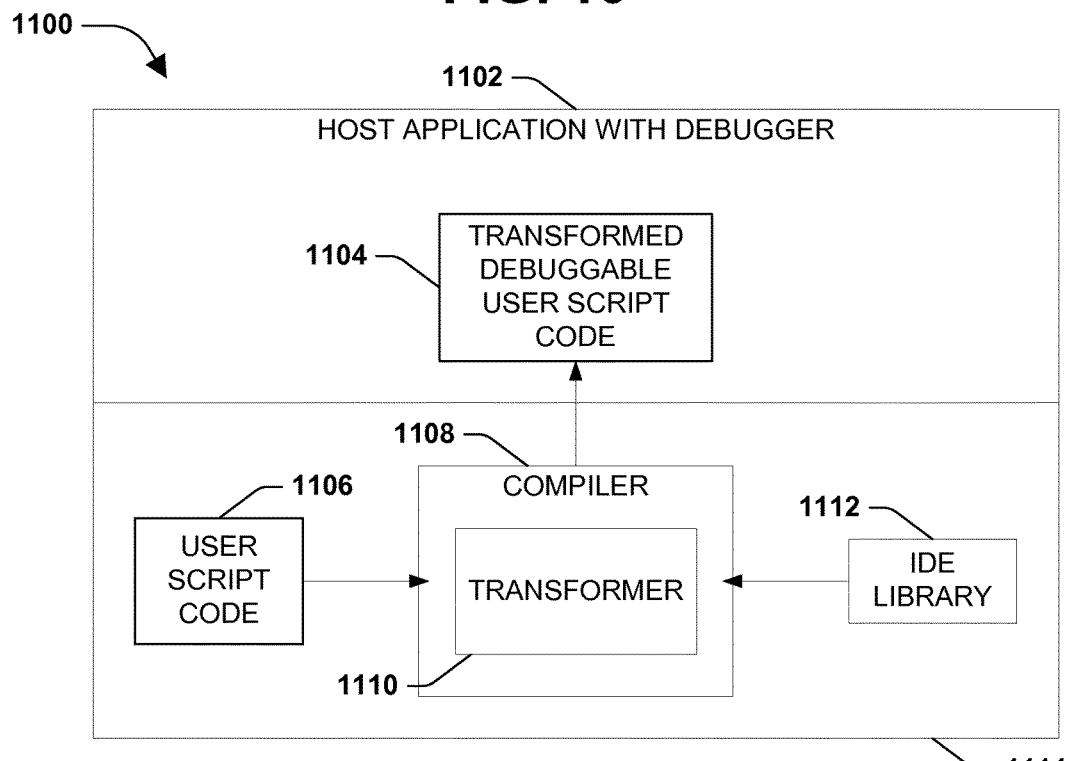
FIG. 11 is an illustration of one embodiment of an example implementation of the exemplary systems described herein.

FIG. 11 is an illustration of one embodiment of an example implementation 1100 of the exemplary system described above. In the exemplary implementation 1100 a host application 1102 (e.g., a spreadsheet application) is running in an application execution and development framework 1114. Execution and development frameworks 1114 typically have a development library 1112 that may comprise functions that can be called by code written and executed within the framework 1114.

In this example, a user can write script code 1106, such as a macro, that can be run in the host application 1102. The user script code 1106 can be written in a high-level language (e.g., C#) and a compiler 1108 that is supported by the framework 1114 can compile the user script code 1106 into an intermediate language that may be sent to a runtime environment in the framework 1114.

In this example 1100, a user script code transformer 1110 may be comprised in the compiler 1108, and transform the user script code 1106 into transformed debuggable user script code 1104 by injecting debuggable features into the code. For example, calls to traceback functions in the library 1112 may be injected into the user script code to allow the host application to continue functioning during debugging. Further, the host application 1102 may comprise a debugger that allows the user to debug their code, and the transformed debuggable user script code 1104 can allow the host application's UI to continue to operate during the debugging process.

In another embodiment, the user script code transformation component may be operably coupled to a dynamic language runtime component for the host application, which can be configured to transform the user script code during just-in-time compilation and execution of the user script code. For example, the user script code may be compiled to an intermediate code for an application development and execution framework then sent to a runtime environment within the framework. A just-in-time compilation service typically compiles intermediate language into machine language during execution of the code. In this embodiment, the just-in-time compiler can comprise the user script code transformation component to transform the user script code into transformed debuggable code during execution.

Figure 12:
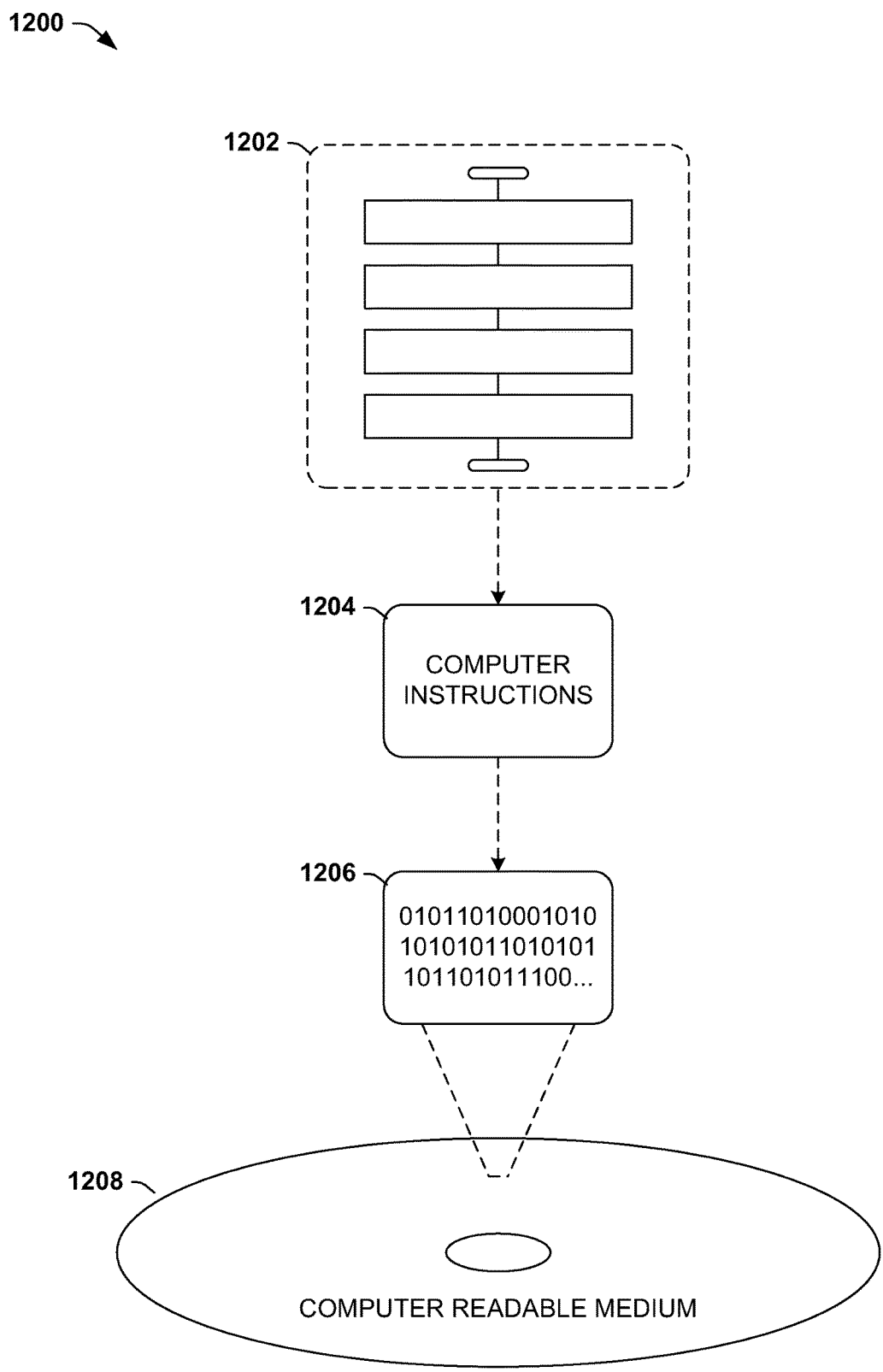
FIG. 12 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 12, wherein the implementation 1200 comprises a computer-readable medium 1208 (e.g., a CD-R, DVD-R, or a platter of a hard disk drive), on which is encoded computer-readable data 1206. This computer-readable data 1206 in turn comprises a set of computer instructions 1204 configured to operate according to one or more of the principles set forth herein. In one such embodiment 1202, the processor-executable instructions 1204 may be configured to perform a method, such as the exemplary method 100 of FIG. 1, for example. In another such embodiment, the processor-executable instructions 1204 may be configured to implement a system, such as the exemplary system 1000 of FIG. 10, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 13:
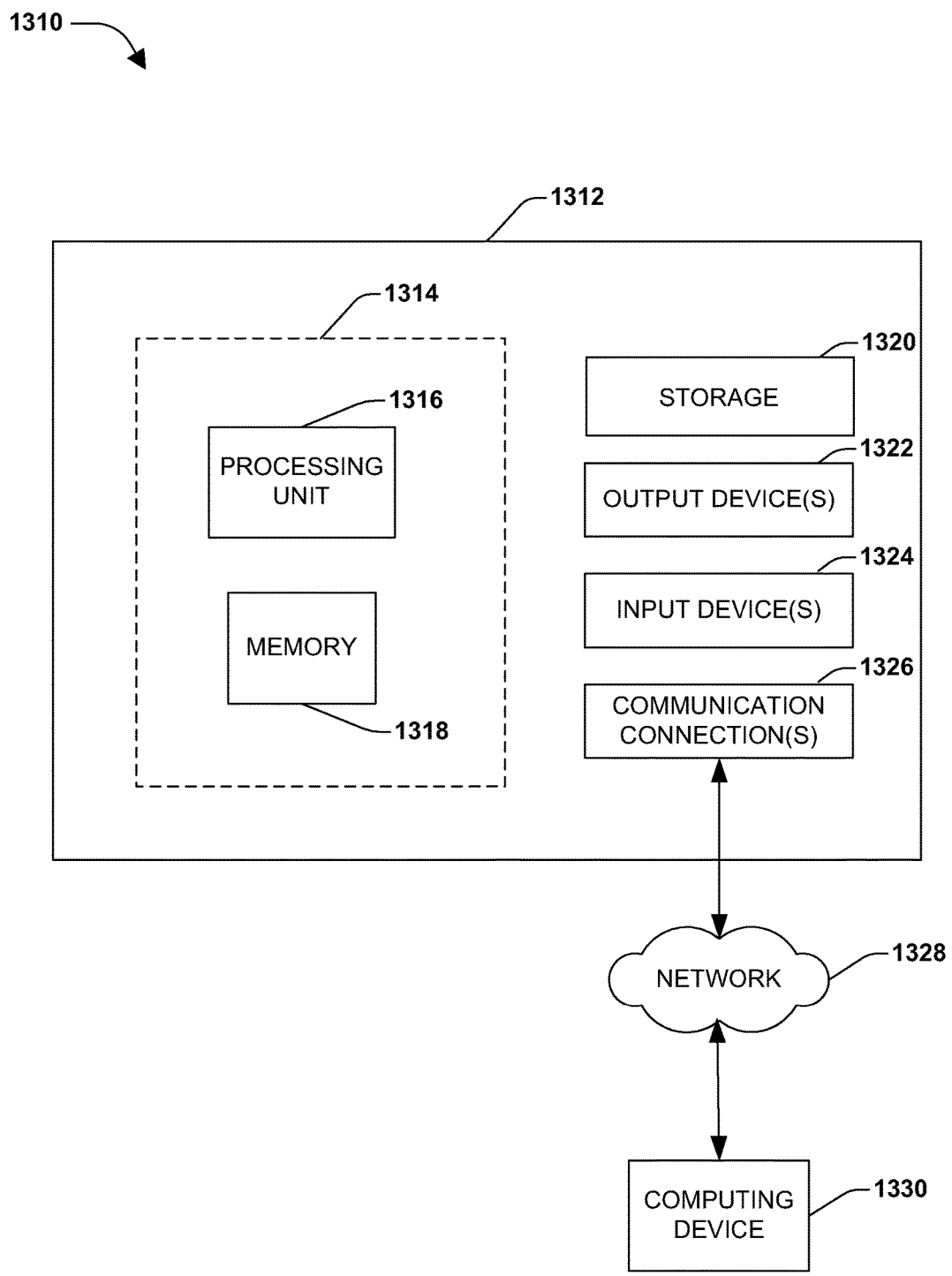
FIG. 13 illustrates an exemplary computing environment wherein one or more of the provisions set forth herein may be implemented.

FIG. 13 illustrates an example of a system 1310 comprising a computing device 1312 configured to implement one or more embodiments provided herein. In one configuration, computing device 1312 includes at least one processing unit 1316 and memory 1318. Depending on the exact configuration and type of computing device, memory 1318 may be volatile (such as RAM, for example), non-volatile (such as ROM, flash memory, etc., for example) or some combination of the two. This configuration is illustrated in FIG. 13 by dashed line 1314.

In other embodiments, device 1312 may include additional features and/or functionality. For example, device 1312 may also include additional storage (e.g., removable and/or non-removable) including, but not limited to, magnetic storage, optical storage, and the like. Such additional storage is illustrated in FIG. 13 by storage 1320. In one embodiment, computer readable instructions to implement one or more embodiments provided herein may be in storage 1320. Storage 1320 may also store other computer readable instructions to implement an operating system, an application program, and the like. Computer readable instructions may be loaded in memory 1318 for execution by processing unit 1316, for example.

The term "computer readable media" as used herein includes computer storage media. Computer storage media includes volatile and nonvolatile, removable and non-removable media implemented in any method or technology for storage of information such as computer readable instructions or other data. Memory 1318 and storage 1320 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1312. Any such computer storage media may be part of device 1312.

Device 1312 may also include communication connection(s) 1326 that allows device 1312 to communicate with other devices. Communication connection(s) 1326 may include, but is not limited to, a modem, a Network Interface Card (NIC), an integrated network interface, a radio frequency transmitter/receiver, an infrared port, a USB connection, or other interfaces for connecting computing device 1312 to other computing devices. Communication connection(s) 1326 may include a wired connection or a wireless connection. Communication connection(s) 1326 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1312 may include input device(s) 1324 such as keyboard, mouse, pen, voice input device, touch input device, infrared cameras, video input devices, and/or any other input device. Output device(s) 1322 such as one or more displays, speakers, printers, and/or any other output device may also be included in device 1312. Input device(s) 1324 and output device(s) 1322 may be connected to device 1312 via a wired connection, wireless connection, or any combination thereof. In one embodiment, an input device or an output device from another computing device may be used as input device(s) 1324 or output device(s) 1322 for computing device 1312.

Components of computing device 1312 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1312 may be interconnected by a network. For example, memory 1318 may be comprised of multiple physical memory units located in different physical locations interconnected by a network.

Those skilled in the art will realize that storage devices utilized to store computer readable instructions may be distributed across a network. For example, a computing device 1330 accessible via network 1328 may store computer readable instructions to implement one or more embodiments provided herein. Computing device 1312 may access computing device 1330 and download a part or all of the computer readable instructions for execution. Alternatively, computing device 1312 may download pieces of the computer readable instructions, as needed, or some instructions may be executed at computing device 1312 and some at computing device 1330.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an"

as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit, for enabling debuggability of a user script code developed for running in a host application, comprising:
    creating a traceback method which implements a debugging feature and is configured to call into the host application; and
    injecting a callback to the traceback method at one or more locations in the user script code, the user script code automating functions of the host application, the traceback method configured to facilitate debugging the user script code while continuing operation of a message pump, that operated before the debugging, to provide non-frozen operation of the host application allowing the host application to continue to function during the debugging.

2. The method of claim 1, further comprising utilizing the message pump to receive a control command from a user interface of the host application and execute an event associated with the control command.

3. The method of claim 1, comprising injecting the callback at a location in the user script code where a stopping operation may be installed for debugging.

4. The method of claim 1, further comprising instrumenting the user script code with a second callback to a second traceback method.

5. The method of claim 1, comprising combining the debugging feature with one or more other debugging features in the user script code using an iterator pattern.

6. The method of claim 1, wherein the debugging feature that is implemented using the callback to the traceback method includes at least one of the following: setting a next active statement, inspecting a variable, editing and continuing, creating an allocated debugger stack frame with an attached dictionary of local variables, creating an allocated debugger frame object, compiling a function into a separate header and body, tracing an exception.

7. The method of claim 1, comprising performing one or more language level constructs that do not utilize cooperation from a virtual machine.

8. The method of claim 1, wherein the debugging feature that is implemented using the callback to the traceback method allows a debugger to set a next active statement in a current frame without executing user code between a current statement and the next active statement by injecting one or more switch tables at a location of a set-next statement in a function.

9. The method of claim 1, wherein the debugging feature includes compiling a function into a separate header and body.

10. The method of claim 1, wherein the traceback method is configured to perform at least one of:
    detecting a debugger request for a stopping operation and stopping a debugger in an execution of the user script code; or
    detecting no debugger request for the stopping operation and treating the callback as a no-operation in the user script code.

11. A system for enabling debuggability of user script code developed for running in a host application comprising:
    one or more processing units; and
    memory comprising instructions that when executed by at least some of the one or more processing units, perform a method, the method comprising:
        instrumenting the user script code with a first debugging feature comprising a first callback to a first traceback method, the user script code automating functions of the host application; and
        combining the first debugging feature with a second debugging feature in the user script code into a common helper function transform using an iterator pattern, the second debugging feature comprising a second callback to a second traceback method, at least one of the first traceback method or the second traceback method configured to facilitate debugging the user script code while allowing continued functioning of the host application during the debugging.

12. The system of claim 11, at least one of the first debugging feature or the second debugging feature comprising transformed user script code configured to facilitate creation of an allocated debugger stack frame.

13. The system of claim 12, wherein the allocated debugger stack frame is associated with a dictionary of one or more local variables.

14. The system of claim 11, wherein the first debugging feature comprising the first callback to the first traceback method supports at least one of the following: setting a next active statement, inspecting a variable, editing and continuing, creating an allocated debugger stack frame with an attached dictionary of local variables, creating an allocated debugger frame object, compiling a function into a separate header and body, tracing an exception.

15. The system of claim 11, the instrumenting comprising compiling a function into a header and a body.

16. A computer readable memory or storage device comprising instructions that when executed perform a method for enabling debuggability of a user script code developed for running in a host application, the method comprising:
    injecting a callback at one or more locations in the user script code, the user script code automating functions of the host application, the callback configured to call to a traceback method configured to facilitate debugging the user script code while continuing operation of a message pump, that operated before the debugging, to provide continued functioning of the host application during the debugging.

17. The computer readable memory or storage device of claim 16, the method comprising applying a script code transformation to a function when the function is compiled.

18. The computer readable memory or storage device of claim 16, comprising transforming the user script code by performing the injecting.

19. The computer readable memory or storage device of claim 18, the transforming comprising performing one or more language level constructs.

20. The computer readable memory or storage device of claim 19, the one or more language level constructs configured to not utilize cooperation from a virtual machine.

* * * * *